US012579563B2

(12) United States Patent
Xu et al.

(10) Patent No.: US 12,579,563 B2
(45) Date of Patent: Mar. 17, 2026

(54) SYSTEMS AND METHODS FOR TEMPORAL KERNEL APPROACH FOR DEEP LEARNING

(71) Applicant: Walmart Apollo, LLC, Bentonville, AR (US)

(72) Inventors: Da Xu, Sunnyvale, CA (US); Evren Korpeoglu, San Jose, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1083 days.

(21) Appl. No.: 17/589,819

(22) Filed: Jan. 31, 2022

(65) Prior Publication Data

US 2023/0245207 A1      Aug. 3, 2023

(51) Int. Cl.
| | |
|---|---|
| *G06Q 30/06* | (2023.01) |
| *G06N 3/049* | (2023.01) |
| *G06N 3/08* | (2023.01) |
| *G06Q 30/0601* | (2023.01) |

(52) U.S. Cl.
CPC ......... *G06Q 30/0631* (2013.01); *G06N 3/049* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 7,421,380 | B2 * | 9/2008 | Thiesson ................. | G06F 18/00 |
| | | | | 702/182 |
| 7,921,042 | B2 | 4/2011 | Jacobi et al. | |
| 8,090,621 | B1 | 1/2012 | Chakrabarti et al. | |
| 8,095,521 | B2 | 1/2012 | Chan et al. | |
| 8,880,439 | B2 | 11/2014 | Archambeau et al. | |
| 10,438,131 | B1 | 10/2019 | Pennington et al. | |
| 10,699,321 | B2 | 6/2020 | Krishnamurthy et al. | |
| 10,824,940 | B1 * | 11/2020 | Rybakov ................. | G06N 7/01 |
| 10,842,940 | B1 | 11/2020 | Pusateri | |
| 10,885,478 | B2 * | 1/2021 | Roberts .......... | G06Q 10/063112 |
| 11,410,042 | B2 * | 8/2022 | Harry Putra ........... | G06N 3/084 |

(Continued)

FOREIGN PATENT DOCUMENTS

WO      2007131185 A2    11/2007

OTHER PUBLICATIONS

Bahdanau et al., "Neural machine translation by jointly learning to align and translate", arXiv preprint arXiv:1409.0473, 2014.

(Continued)

*Primary Examiner* — Maikhanh Nguyen
(74) *Attorney, Agent, or Firm* — Morgan, Lewis & Bockius LLP; Manita Rawat

(57) ABSTRACT

System and method for time-aware deep learning are provided. A training data set including continuous-time data and a deep learning architecture are received. A trained deep learning model is generated using a temporal kernel approach. The temporal kernel approach includes constructing a temporal kernel based on the continuous-time data and composing the temporal kernel with a selected hidden layer of the deep learning architecture to generate a hidden output. The trained deep learning model is output for use in one or more machine learning tasks.

6 Claims, 7 Drawing Sheets

(56) References Cited

U.S. PATENT DOCUMENTS

| | | |
|---|---|---|
| 2010/0049663 A1 | 2/2010 | Kane, Jr. et al. |
| 2011/0257949 A1 | 10/2011 | Vasudevan et al. |
| 2014/0188865 A1 | 7/2014 | Karatzoglou et al. |
| 2016/0071024 A1* | 3/2016 | Amer ...................... G06F 18/29 |
| | | 706/12 |
| 2018/0075137 A1 | 3/2018 | Lifar et al. |
| 2018/0096259 A1* | 4/2018 | Andrews ................ G06V 10/82 |
| 2018/0204113 A1 | 7/2018 | Galron et al. |
| 2018/0253640 A1* | 9/2018 | Goudarzi ............... G16H 50/20 |
| 2018/0349158 A1 | 12/2018 | Swersky et al. |
| 2019/0108444 A1* | 4/2019 | Song ...................... G06N 3/082 |
| 2019/0251446 A1 | 8/2019 | Fang et al. |
| 2021/0042619 A1* | 2/2021 | Dasgupta ............... G06N 3/047 |
| 2021/0133846 A1* | 5/2021 | Xu ...................... G06Q 30/0641 |

OTHER PUBLICATIONS

Bengio et al., "Representation learning: A review and new perspectives", IEEE transactions on pattern analysis and machine intelligence, 35(8):1798-1828, 2013.

Chen, et al., "Spatial and channel-wise attention in convolutional networks for image captioning", In Proceedings of the IEEE conference on computer vision and pattern recognition, pp. 5659-5667, 2017.

Chorowski et al., "Attention-based models for speech recognition", In Advances in neural information processing systems, pp. 577-585, 2015.

Dinh et al., "Density estimation using real nvp", arXiv preprint arXiv:1605.08803, 2016.

Du et al., "Recurrent marked temporal point processes: Embedding event history to vector", In Proceedings of the 22nd ACM SIGKDD International Conference on Knowledge Discovery and Data Mining, pp. 1555-1564. ACM, 2016.

Harper et al., "The movielens datasets: History and context", ACM Trans. Interact. Intell. Syst., 5(4):19:1-19:19, Dec. 2015. ISSN 2160-6455. doi: 10.1145/2827872. URL http://doi.acm.org/10.1145/2827872.

Hidasi et al., "Session-based recommendations with recurrent neural networks", arXiv preprint arXiv:1511.06939, 2015.

Jackson, "The theory of approximation", vol. 11. American Mathematical Soc.,1931, p. 501-505.

Kang et al., "Self-attentive sequential recommendation", In 2018 IEEE International Conference on Data Mining (ICDM), pp. 197-206. IEEE, 2018.

Kingma et al., "Auto-encoding variational bayes", arXiv preprint arXiv:1312.6114, 2013.

Li et al., "Time-dependent representation for neural event sequence prediction", arXiv preprint arXiv:1708.00065, 2017.

Loomis, "Introduction to abstract harmonic analysis", Courier Corporation, 2013.

Mei et al., "The neural hawkes process: A neurally self-modulating multivariate point process", In Advances in Neural Information Processing Systems, pp. 6754-6764, 2017.

Mercer, "Xvi. functions of positive and negative type, and their connection the theory of integral equations", Philosophical transactions of the royal society of London. Series A, containing papers of a mathematical or physical character, 209(441-458):415-446, 1909.

Papamakrios et al., "Masked autoregressive flow for density estimation", In Advances in Neural Information Processing Systems, pp. 2338-2347, 2017.

Rahimi et al., "Random features for large-scale kernel machines", In Advances in neural information processing systems, pp. 1177-1184, 2008.

Rezende et al., "Variational inference with normalizing flows", arXiv preprint arXiv:1505.05770, 2015.

Tang et al., "Personalized top-n sequential recommendation via convolutional sequence embedding", In Proceedings of the Eleventh ACM International Conference on Web Search and Data Mining, pp. 565-573. ACM, 2018.

Vaswani et al., "Attention is all you need", In Advances in neural information processing systems, pp. 5998-6008, 2017.

Widom, "Asymptotic behavior of the eigenvalues of certain integral equations. ii.", Archive for Rational Mechanics and Analysis, 17(3):278-295, 1964.

Xiao et al., "Joint modeling of event sequence and time series with attentional twin recurrent neural networks", arXiv preprint arXiv:1703.08524, 2017.

Xiao et al., "Modeling the intensity function of point process via recurrent neural networks", In Thirty-First AAAI Conference on Artificial Intelligence, 2017.

Xu et al., "Context-aware dual representation learning for complementary products recommendation", arXiv preprint arXiv:1904.12574v2, 2019.

Xu et al., "Show, attend and tell: Neural image caption generation with visual attention", arXiv preprint arXiv:1502.03044, 2015.

Zhao et al., "Seismic: A self-exciting point process model for predicting tweet popularity", In Proceedings of the 21th ACM SIGKDD International Conference on Knowledge Discovery and Data Mining, pp. 1513-1522. ACM, 2015.

Zhu et al., "What to do next: Modeling user behaviors by time-Istm", In IJCAI, pp. 3602-3608, 2017.

Tavenard, et al., "Efficient Temporal Kernels between Feature Sets for Time Series Classification", Efficient Temporal Kernels between Feature Sets for Time Series Classification. European Conference on Machine Learning and Principles and Practice of Knowledge Discovery, Sep. 2017, Skopje, Macedonia.

Phillips, et al., "Spectral Density Estimation and Robust Hypothesis Testing Using Steep Origin Kernels without Truncation", International Economic Review vol. 47, No. 3, 2005, pp. 837-894.

Min, et al., "Non-Parametric Spectral Density Estimation Under Long-Range Dependence", J. Time Ser. Anal., 2018, 22 pages.

Lopez-Ramos, et al., "Explainable nonlinear modelling of multiple time series with invertible neural networks", arXiv, Jul. 2021, 12 pages.

Lomeli, et al., "Antithetic and Monte Carlo Kernel Estimators for Partial Rankings." Statistics and Computing, Feb. 21, 2019, link. springer.com/article/10.1007/s 11222-019-09859-z?error=cookies_not_supported&code=883a2c43-b19e-487e-a844-3e77e1a9bcb3.

Milton, et al. "Spatial Analysis Made Easy with Linear Regression and Kernels." ArXiv.Org, arXiv, Feb. 22, 2019, arxiv.org/pdf/1902.08679.pdf.

Xu, et al., "A Temporal Kernel Approach for Deep Learning With Continuous-Time Information", ICLR 2021, Mar. 28, 2021, pp. 1-33.

Huang, et al., "Recommender engine for continuous-time quantum Monte Carlo methods." Phsyical Review, E 95031301 (R) Published Mar. 29, 2017.

D. Xu et al., "Self-attention with Functional Time Representation Learning," 33rd Conference on Neural Information Processing Systems (NeurIPS 2019), Vancouver, Canada, (Year: 2019), 18 pages.

* cited by examiner

100

Receive Data Set Including
Continuous-Time Information                    ~102

Normalize Prior System Interactions            ~104

Modify Deep Learning Architecture
to include a Temporal Kernel                   ~106

Generate Hidden Layer(s) based on Random
Feature Sampling of Temporal Kernel            ~108

Output Trained Prediction Model                ~110

200

Receive User Identifier ~202

Obtain Set of Prior User Interactions ~204

Generate Candidate List of Complimentary Items ~206

Provide User Interactions and Optional
Candidate List to Trained Prediction Model ~208

Generate Ranked List of User
Specific Item Recommendations ~210

SYSTEMS AND METHODS FOR TEMPORAL KERNEL APPROACH FOR DEEP LEARNING

TECHNICAL FIELD

This application relates generally to system and methods for machine learning and, more particularly, to machine learning that characterizes continuous-time systems.

BACKGROUND

Existing deep learning models used for sequence learning tasks include recurrent neural networks (RNN), long-short term memory (LSTM), causal convolution neural networks (CausalCNN/WaveNet), and attention mechanisms. However, existing sequential deep learning models, such as RNN, causal CNN, and attention mechanisms do not readily consume continuous-time information due to the complication of incorporating time when a sequence is irregularly sampled (e.g., spaced). Current deep learning models require temporal data to be discretized, for example, by aggregating continuous-time data into bins and treating the bins as equally-spaced.

Current methods of incorporating continuous-time data, such as discretization of the data, causes inconsistencies even for simple continuous-time processes and modify the spectral structure of the data. For irregular data, discretizing temporal information introduces intractable noise and perturbations into the data set. Although previous efforts have been made to incorporate temporal information, known approaches fail to provide any guidance in what way and to what extent continuous-time signal interact with the existing deep learning models. Current solutions are heuristic-driven, for example, using a timestamp as a numerical feature in the deep learning model.

SUMMARY

In various embodiments, a system for deep learning is disclosed. The system includes a computing device configured to receive a training data set including continuous-time data, receive a deep learning architecture, generate a trained deep learning model using a temporal kernel approach, and output the trained deep learning model. The temporal kernel approach includes constructing a temporal kernel based on the continuous-time data and composing the temporal kernel with a selected hidden layer of the deep learning architecture to generate a hidden output.

In various embodiments, a non-transitory computer readable medium having instructions stored thereon is disclosed. The instructions, when executed by a processor cause a device to perform operations including receiving a training data set including continuous-time data, identifying a deep learning architecture, generating a trained deep learning model using a temporal kernel approach, and outputting the trained deep learning model. The temporal kernel approach includes constructing a temporal kernel based on the continuous-time data and composing the temporal kernel with a selected hidden layer of the deep learning architecture to generate a hidden output.

In various embodiments, a computer-implemented method is disclosed. The method includes a step of receiving continuous-time data, identifying a deep learning architecture, training a deep learning model, and outputting the trained deep learning model. The deep learning model is trained by constructing a temporal kernel based on the continuous-time data and composing the temporal kernel with a selected hidden layer of the deep learning architecture to generate a hidden output.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
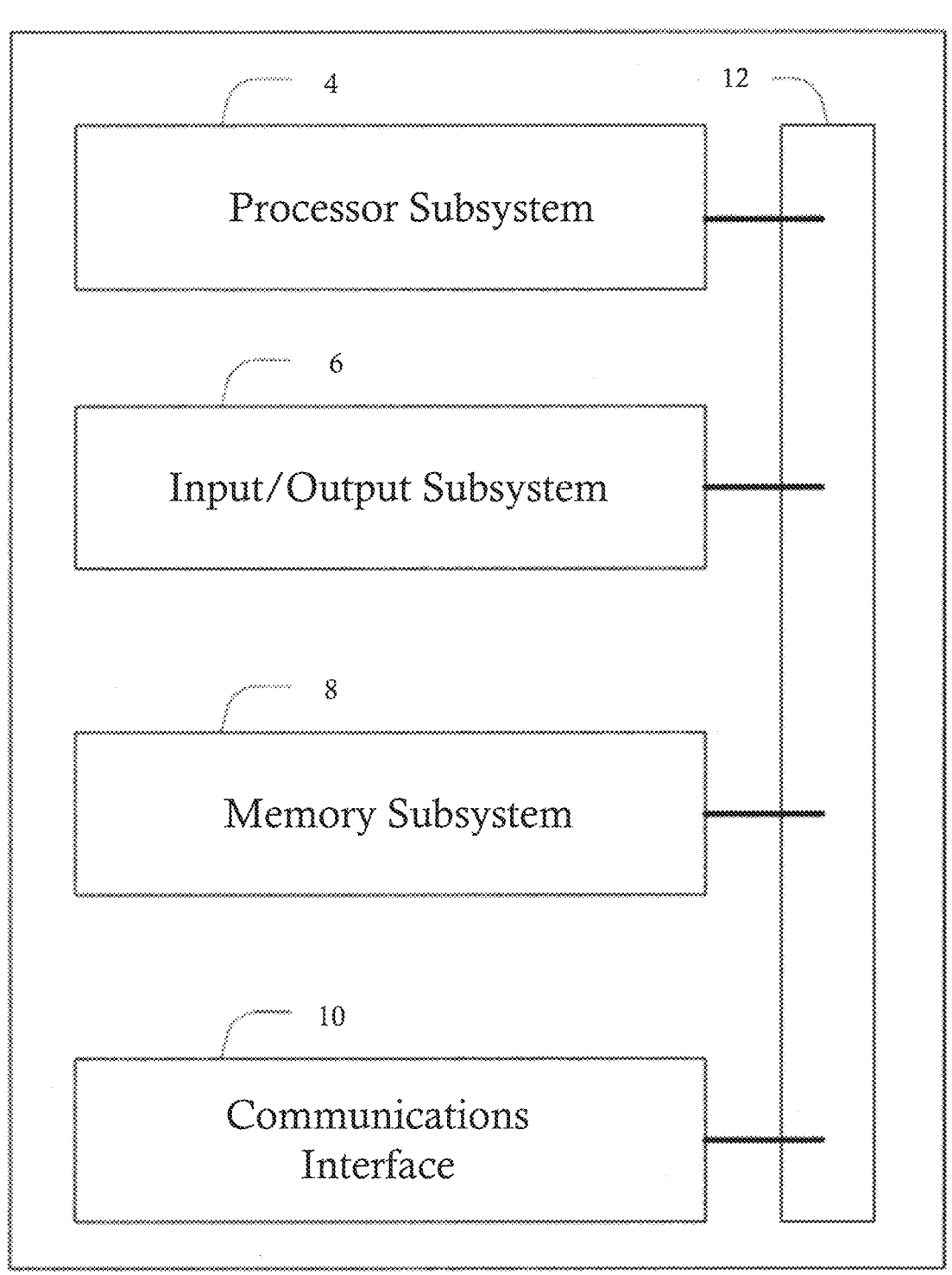
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of deep learning for continuous-time information using a temporal kernel approach are disclosed. The disclosed systems and methods provide a principled mechanism to characterize continuous-time systems using deep learning tools. The disclosed systems and methods may be applied to existing deep learning processes and architecture with little to no modification of to the implementation of the respective processes and/or architectures. In some embodiments, a continuous-time system is represented by composing one or more neural network with a temporal kernel. The temporal kernel may be represented by a random feature approach and conversion of a kernel learning problem to a spectral density estimation under reparameterization. The disclosed systems and methods provide convergence and consistency in machine learning even in instances where a temporal kernel is non-stationary and/or the spectral density is specified incorrectly.

In various embodiments, systems and methods of deep learning for continuous-time information using a temporal kernel approach utilizes a connection between the continuous-time system and the neural Gaussian process in composition of the temporal kernel. The temporal kernel fills the gaps between signal processing and deep learning which allows explicit characterization of continuous-time systems while allowing application of existing deep learning architectures and optimization procedures. Unlike existing kernel learning methods (where at least the parametric form of a kernel is given), the temporal kernel does not provide usable context. In some embodiments, Bochner's theorem and/or an extension of Bochner's Theorem, to convert the kernel learning problem to a spectral domain in which spectral properties can be directly characterized with random (e.g., Fourier) features. Representing the temporal kernel by random features preserves the existing Gaussian processes and the neural tangent kernel (NTK) properties of neural networks. A reparametirization is applied to jointly optimize a spectral density estimator.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including a temporal kernel approach for deep learning, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
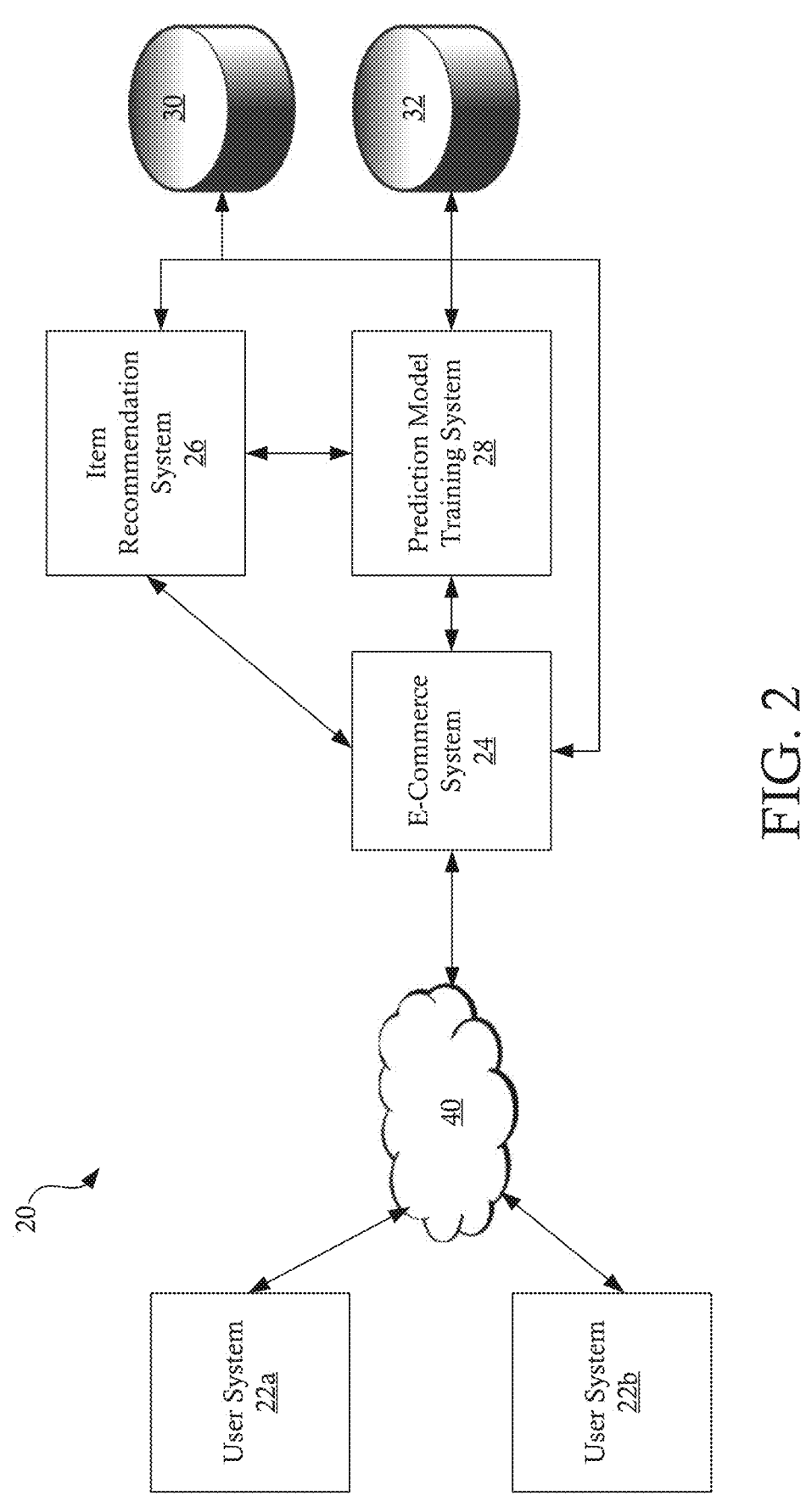
FIG. 2 illustrates a network configured to provide machine learning using a temporal kernel approach for deep-learning with continuous-time information, in accordance with some embodiments.

FIG. 2 illustrates a network environment 20 configured to provide personalized user recommendations based at least partially on temporal values embedded into a finite-dimensional vector space, in accordance with some embodiments. The network 20 includes a plurality of user systems 22a, 22b in signal communication with a network interface system 24 via one or more intervening networks, illustrated as network cloud 40. The network interface system 24 is in signal communication with a recommendation system 26 and a prediction model generation system 28. In some embodiments, the network interface system 24, the recommendation system 26 and/or the prediction model generation system 28 are in signal communication with a product database 30 and/or an interaction database 32. Although embodiments are illustrated with various systems and components 24-32 shown as separate elements, it will be appreciated that various systems and components may be combined into a single system and/or be split out into additional systems. For example, in some embodiments, each of the e-commerce system 24, the item recommendation system 26, the prediction model generation system 28, the product database 30, and/or the interaction database 32 may be combined into a single system and/or divided among multiple systems. It will be appreciated that any suitable physical and/or logical combination of systems and components is possible.

In some embodiments, a user system 22a, 22b interacts with a network interface provided by the network interface system 24. The network interface is configured to enable a user to perform one or more network activities. For example, in some embodiments, the network interface includes an e-commerce interface configured to allow a user to view, search, purchase, and/or otherwise interact with items in an e-commerce environment. In some embodiments, the network interface is configured to provide recommended items to a user system 22a, 22b based on prior interactions between the network interface and the user systems 22a, 22b. The recommended items may be selected from items stored in the product database and are ranked by a trained prediction model using prior user interactions. In some embodiments, the items are stored in item database 30 and the prior user interactions are stored in the interaction database 32. As discussed in greater detail below, the trained prediction models may include models trained using deep learning architectures configured to process continuous-time information using a temporal kernel approach.

In some embodiments, the network interface system 24 receives a set, or list, of recommended items for a specific user system 22a, 22b from the recommendation system 26. The recommendation system 26 generates the set of recommended items based on a trained prediction model. The trained prediction model includes a deep learning architecture configured to process continuous-time information using a temporal kernel approach. The trained prediction model is configured to generate time-aware, personalized item recommendations for each user based on a set of prior user interactions. The set of personalized item recommendations may be generated and provided to the network interface system 24 at a predetermined interval, such as, for example, weekly, daily, etc.

In some embodiments, the trained prediction model is generated by the prediction model generation system 28 and provided to the recommendation system 26 and/or a production environment for deployment to a recommendation system 26. The trained prediction model may be updated by replacing the current trained prediction model with a new trained prediction model generated by the prediction model generation system 28 at a predetermined interval, such as, for example, bi-monthly, monthly, weekly, etc. As discussed below, each trained prediction model is generated, at least partially, using temporal information embedded into a finite-dimensional vector space and includes a neural network structure having at least one self-attention layer.

In some embodiments, the prediction model generation system 28 implements a temporal kernel approach to train deep learning architectures on continuous-time information. The temporal kernel approach allows explicit characterization of continuous-time systems in existing and new deep learning architectures and optimization procedures. The temporal kernel may be represented by a spectral domain generated by random features. The spectral density estimator may be optimized by applying reparametrization. In some embodiments, the prediction model generation system 28 is configured to generate trained deep learning models configured to utilize continuous-time information without discretization.

Figure 3:
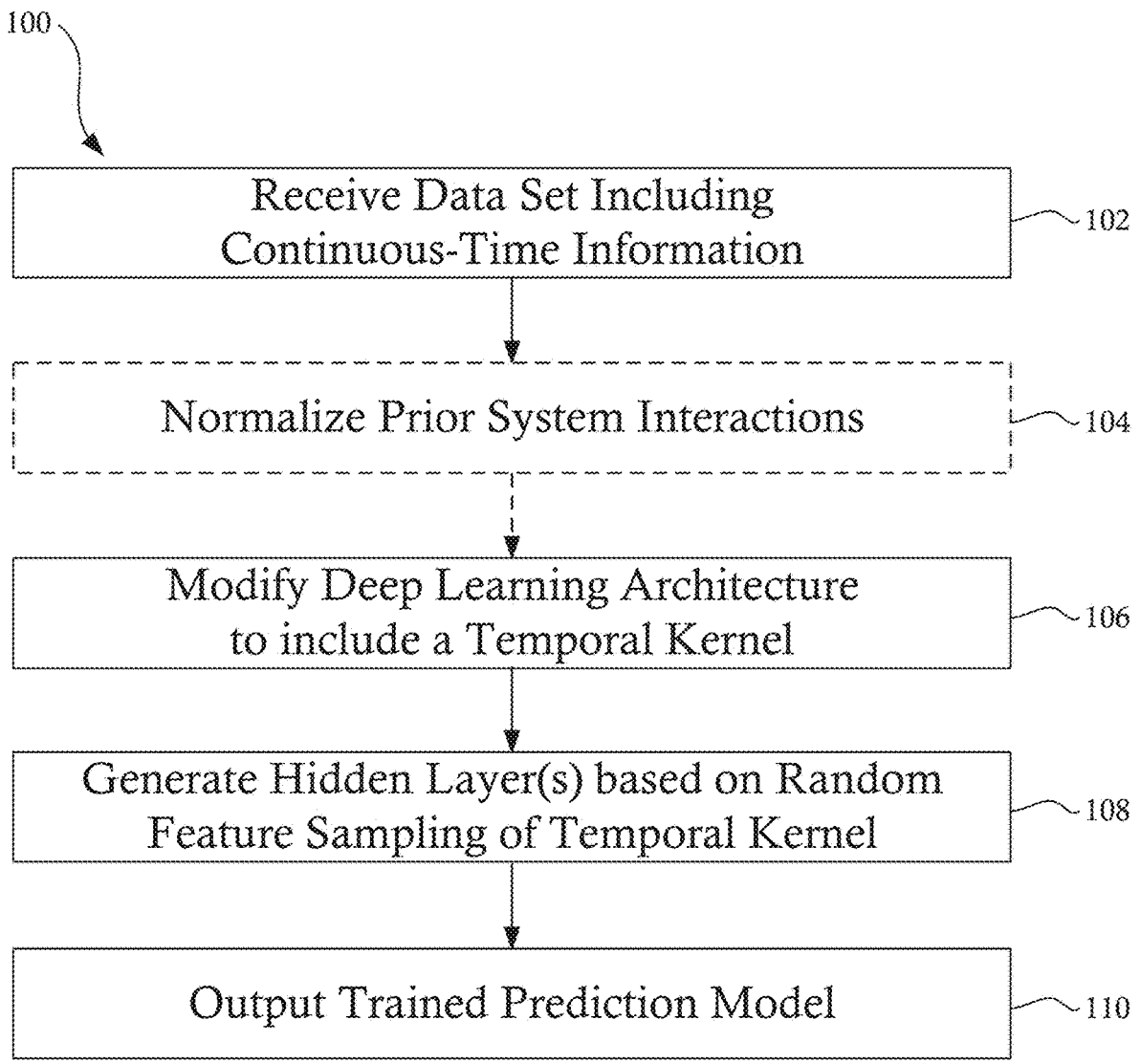
FIG. 3 is a flowchart illustrating a method of generating a deep learning model configured to incorporate continuous time-information using a temporal kernel approach, in accordance with some embodiments.
Figure 4:
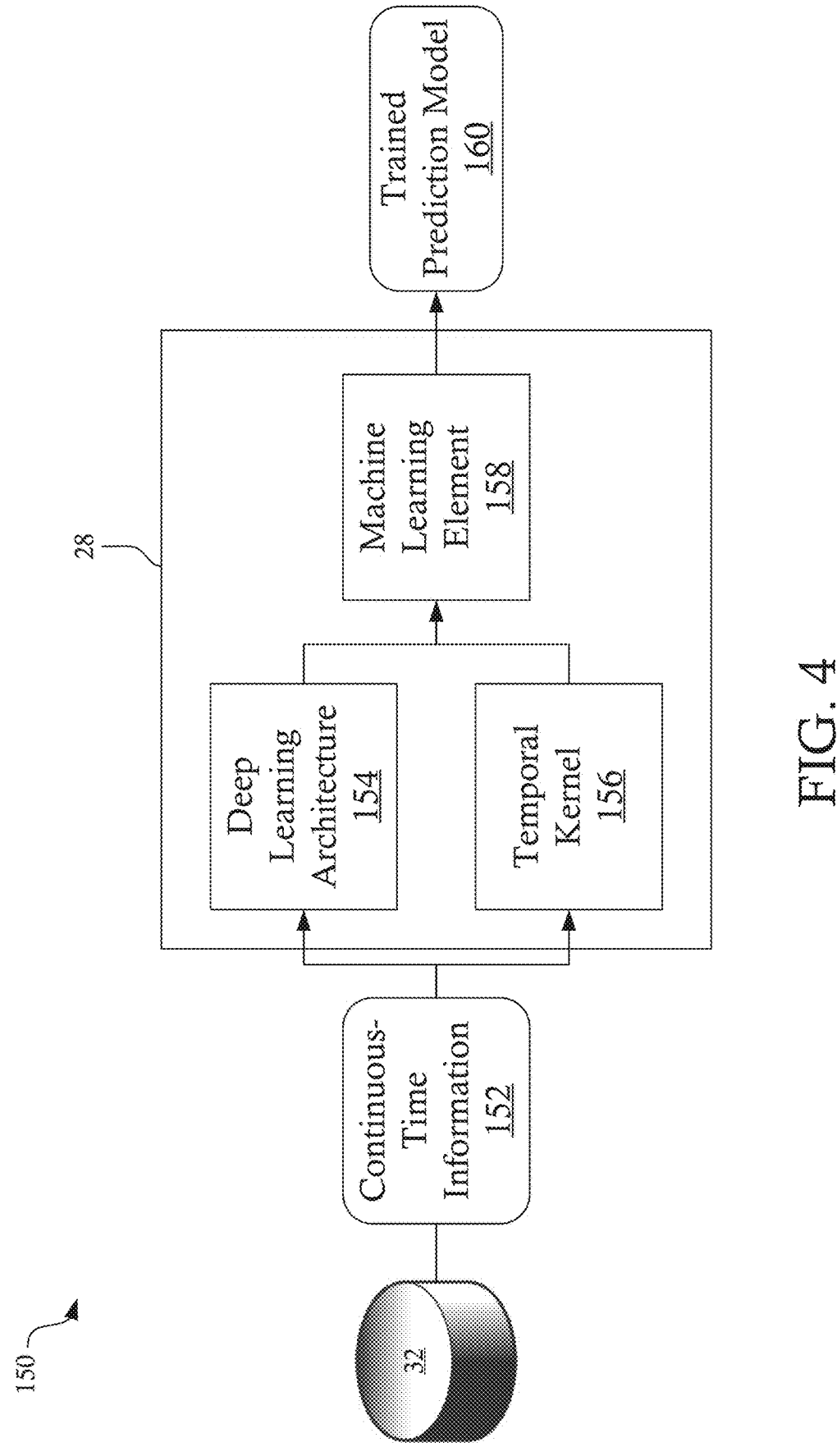
FIG. 4 is a process flow illustrating various steps of the method of generating a deep learning model illustrated in FIG. 3, in accordance with some embodiments.

FIG. 3 is a flowchart illustrating a method 100 of generating a trained deep learning model configured to implement a temporal kernel approach, in accordance with some embodiments. FIG. 4 illustrates a process flow 150 illustrating various steps of the method 100 of generating a trained deep learning model illustrated in FIG. 3, in accordance with some embodiments. The method 100 is described with reference to FIGS. 3 & 4. At step 102, a set of prior system interactions 152 is received by a system configured to train a neural network, such as, for example, the prediction model training system 28.

In some embodiments, the set of prior system interactions 152 includes prior user interactions (or impressions) with one or more systems (such as a network interface system 24) and corresponding time values. User interactions may include any time-sequential interactions within the context of the network interface. For example, in an e-commerce environment, prior interactions may include, but are not limited to, user item interactions such as an item view (e.g., user seeing an item in search results, recommended items, ad, etc.), item click-through (e.g., user clicking on link to go to product-specific information), item add-to-cart (e.g., user adding the product to a virtual cart for future purchase), item purchase (user ordering the item), etc. User interactions may also include, but are not limited to, user specified or derived information such as user preferences (color preference, brand preference, etc. of the specific user), aggregated information, anonymized information, and/or any other suitable user interactions. The set of prior system interactions 152 also includes time values for each of the user interactions in the set of prior system interactions 152. The time values may be provided in any suitable format, such as, for example, system time references, absolute time references, time deltas from a set start time, etc.

In some embodiments, the set of prior system interactions 152 may be received from a database configured to maintain prior interaction data, such as, for example, interaction database 32. The set of prior system interactions 152 may be obtained from file system data, such as, for example, log data. The log data may be generated and/or maintained by any suitable system, such as the e-commerce system 24. In some embodiments, log data is maintained for each user.

At optional step 104, the set of prior system interactions 152 may be preprocessed. The preprocessing may be performed by any suitable mechanism, such as, for example, a preprocessing element 154 implemented by the prediction model training system 28, although it will be appreciated that preprocessing may be performed by any suitable system and the set of prior system interactions 152 may be processed prior to being stored in and/or after being retrieved from a storage mechanism, such as the database 32. In some embodiments, preprocessing includes limiting the set of prior system interactions to user sets having at least a predetermined number of interactions or a maximum number of interactions, user sets having at least one interaction within a predetermined time period, interactions within a predetermined category, and/or otherwise limited. For example, in various embodiments, the set or prior interactions 152 may be limited to the last N interactions (where N is any integer greater than 1), limited to users having at least N interactions (e.g., 5, 10, 15, etc.), limited to products having at least N user interactions (e.g., 3, 4, 5, 6, etc.), and/or limited using any other suitable criteria. In some embodiments, the set of prior interactions 152 is split into multiple sets, including, for example, a training set, a validation set, a test set, etc. Preprocessing may further include, but is not limited to, normalization of the item/product interactions and/or time values.

At step 106, a deep learning architecture 154 is selected and modified to include a temporal kernel 156 (e.g., a time-aware kernel) and, at step 108, a random feature representation of the temporal kernel is used to generate a hidden layer during a machine learning process 158, in accordance with some embodiments. The selected deep learning architecture 154 may include any suitable deep learning architecture, such as, for example, an RNN architecture, a CNN architecture, an attention mechanism architecture, and/or any other suitable deep learning architecture. As discussed in greater detail below, the disclosed method for modifying a deep learning architecture 154 to include a temporal kernel 156 may be applied to any known or later developed deep learning architecture 154.

Figure 5:
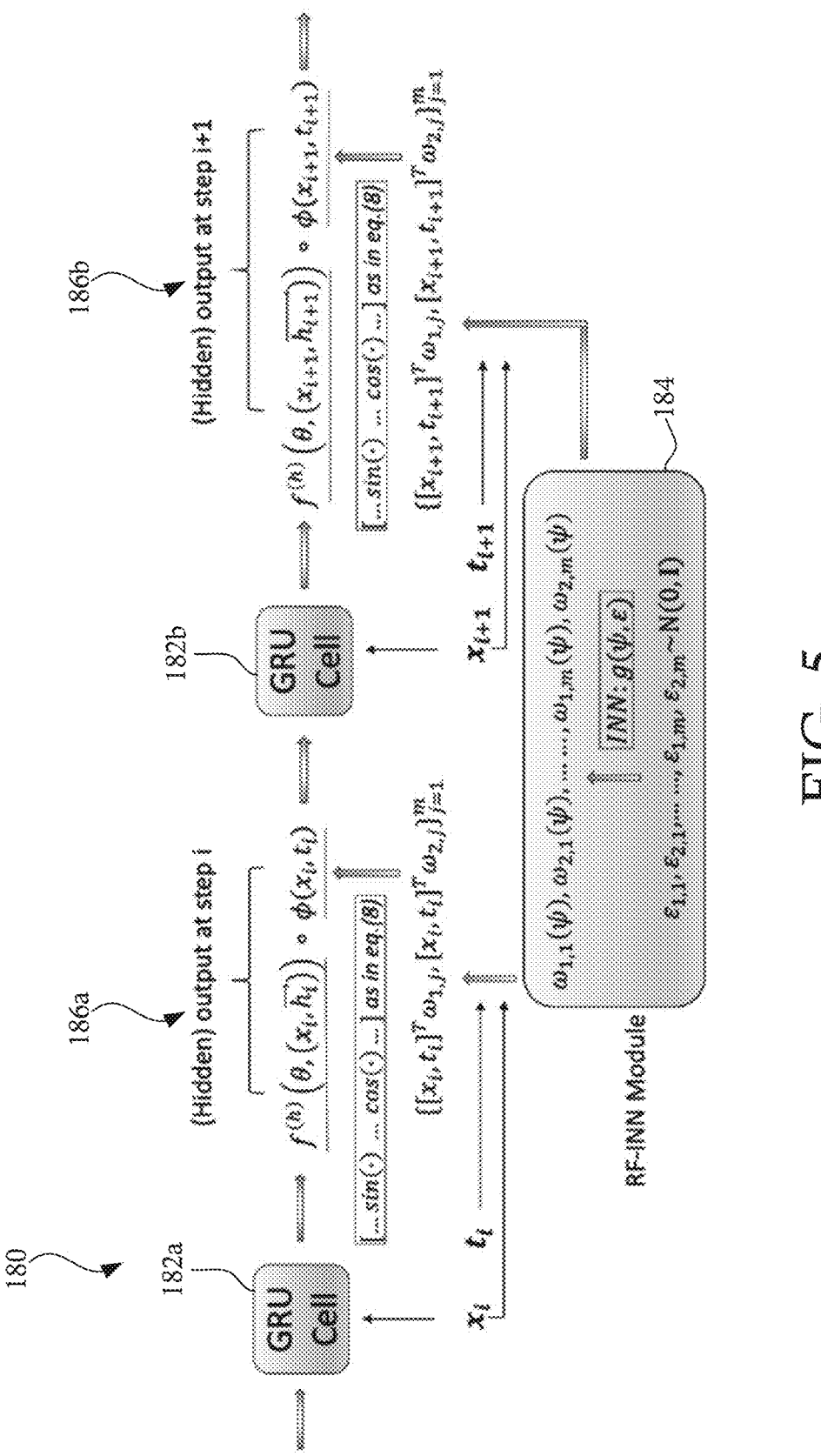
FIG. 5 illustrates one embodiment of a modified RNN network configured to utilize a temporal kernel approach, in accordance with some embodiments.

FIG. 5 illustrates one embodiment of a modified RNN network 180 configured to utilize a time-aware kernel, in accordance with some embodiments. The modified RNN network 180 includes a plurality of gated recurrent units (GRU) cells 182. Each of the GRU cells 182 takes a feature vector x and a hidden state of a prior step as input. For example, for the $i_{th}$ iteration of the RNN network 180, the $i_{th}$ GRU cell 182 receives a feature vector $x_i$ and a hidden state $\vec{h}_i$ of the prior step as input.

For each forward and backward computation, a sample is obtained from an auxiliary temporal distribution using the random feature (RF) invertible neural network (INN) 184. The sample is used to construct a random feature representation $\phi$ using reparametrization, as discussed in greater detail below. The random feature representation $\phi$ is composed with the selected hidden layer $f^{(h)}$ to generate the hidden output 186a of a given stage 182a. Generation of the random feature representation $\phi$ is discussed below. The RF-INN module 184 is called once for each layer.

In some embodiments, a simple univariate continuous-time system $f(t)$ may be represented as:

$$\frac{d^2 f(t)}{dt^2} + a_0 \frac{df(t)}{dt} + a_1 f(t) = b_0 \epsilon(t)$$

(equation 1). As will be appreciated, a discretization with a fixed interval, as used in traditional processing, would be given by:

$$f_{[i]} = f(i \times \text{interval}) \text{ for } i=1,2,\ldots,n$$

As $f(t)$ is a second-order auto-regressive process, both $f(t)$ and $f_{[i]}$ are stationary. A covariance function for a station process is given by:

$$k(t) := \text{cov}(f(t_0), f(t_0+t))$$

and the spectral density function is defined as:

$$s(\omega) = \int_{-\infty}^{\infty} \exp(-i\omega t)k(t)dt$$

As will be appreciated, the spectral density function for $f(t)$ and $f_{[i]}$ are therefore different. In order to avoid modification of the spectral density function, the disclosed method utilizes the continuous-time information without conversion to discrete time.

Taking the Fourier transform of equation 1 and rearranging the terms provides:

$$\tilde{f}(i\omega) = \left(\frac{b_0}{(i\omega)^2 + a_0(i\omega) + a_1}\right)\tilde{\epsilon}(i\omega)$$

where $\tilde{f}(i\omega)$ is the Fourier transform of $f(t)$ and $\tilde{\epsilon}(i\omega)$ is the Fourier transform of $\epsilon(t)$. As the spectral density of a Gaussian noise process is constant, e.g.:

$$|\tilde{\epsilon}(i\omega)|^2 = p_0$$

then the spectral density of $f(t)$ is given by:

$$s_{\theta_T}(\omega) = p_0 \left|\frac{b_0}{(i\omega)^2 + a_0(i\omega) + a_1}\right|^2$$

where $\theta_T = [a_0, a_1, b_0]$ to denote the parameters of the linear dynamic system defined in equation 1 and the subscript T is added to distinguish the parameters of the continuous-time information spectral density from the parameters of a neural network. Because the linear differential equation of $f(t)$ is a linear operation on $\epsilon(t)$, the covariance function for $f(t)$ is a Gaussian process given by the inverse Fourier transform of the spectral density:

$$K_T(t, t') := k_{\theta_T}(t' - t) = \frac{1}{2\pi}\int s_{\theta_T}(\omega)\exp(i\omega t)d\omega$$

(equation 2). There is a correspondence between the parameterization of a stochastic ODE and the kernel of a Gaussian process, which allows parameterization of a continuous-time process using deep learning models by applying connections between neural networks and Gaussian processes.

In some embodiments, the neural network kernel $\Sigma^{(h)}$ (e.g., for the $h^{th}$ layer of a feedforward network (FFN), such as RNN 200, can be connected to a continuous-time system based on the interconnections between the neural network kernel, $\Sigma^{(h)}$, and the temporal kernel, $K_T$. The neural network kernel characterizes the covariance structures among the hidden representation of the input data (as transformed by the neural network) at any fixed point in time, while the temporal kernel, which corresponds to some continuous-time system, characterizes how each static neural network kernel propagates forward in time. Using the continuous time system previously discussed, an integrated continuous-time system can be defined as:

$$a_2(x)\frac{d^2 f(x, t)}{dt^2} + a_1(x)\frac{df(x, t)}{dt} + a_0(x)f(x, t) = b_0(x)\epsilon(x, t),$$

-continued $$\epsilon(x, t = t_0) \sim N\left(0, \sum{}^{(h)}\right),$$

$$\forall t_0 \in T$$

where the neural network kernel $\Sigma^{(h)}$ to define the Gaussian process $\in (x, t)$ on the feature dimension, resulting in the ODE parameters being functions of the data (equation 3). Equation 3 generalizes the $h^{th}$ layer of a FFN to the temporal domain. For example, in an embodiment in which $a_2 (x) = a_1 (x) = 0$ and $a_0 (x) = b_0 (x)$, the continuous-time process $f(x, t)$ exactly follows $f^{(h)}$ at any fixed point t and the trajectory on the time axis is a Gaussian process. When $a_2(x)$, $a_1(x) \neq 0$, $f(x, t)$ still matches $f^{(h)}$ at an initial point, but propagation on the time axis is characterized by the constructed continuous-time system. Equation 3 can be modified to incorporate higher-order terms as needed:

$$a_n(x)\frac{d^n f(x, t)}{dt^n} + \ldots + a_0(x)f(x, t) = b_m(x)\frac{d^m \epsilon(x, t)}{dt^m} + \ldots + b_0(x)\epsilon(x, t)$$

(equation 4). The kernel function for $f(x, t)$ in equation 4 is given by:

$$\sum{}_T^{(h)}(x, t; x', t') = k_{\theta_T}(x, t; x', t') \cdot \sum{}^{(h)}(x, x')$$

where $\theta_T$ is an underlying parameterization of $$\{a_i(\cdot)\}_{i=1}^n \text{ and } \{b_i(\cdot)\}_{i=1}^m$$

as functions of x. When $$\{a_i(\cdot)\}_{i=1}^n \text{ and } \{b_i(\cdot)\}_{i=1}^m$$

are scalars, $$\sum{}_T^{(h)}(x, t; x', t') = k_{\theta_T}(t, t') \cdot \sum{}^{(h)}(x, x')$$

Thus, it is possible to expand any layer of a standard neural network to the temporal domain as part of a continuous-time system using kernel composition. This composition (e.g., modification) can occur at any hidden layer. For example, given the temporal kernel $K_T$ and a neural network $\Sigma^{(h)}$, a neural-temporal kernel may be obtained as:

$$\mathcal{X} \times \mathcal{T} : \sum{}_t^{(h)} = \text{diag}\left(\sum{}^{(h)} \otimes K_T\right)$$

where diag(•) is the partial diagonalization operation on $\mathcal{X}$:

$$\sum{}_t^{(h)}(x, t; x', t') = \sum{}^{(h)}(x, x') \cdot K_T(x, t; x', t')$$

Using neural networks, the hidden representation (feature lift) can be parameterized in the feature space rather than the kernel function in the kernel space. In order to provide a consistent characterization, the feature representation of the temporal kernel is combined with the hidden representation of the neural network.

In order to provide for a combination of the feature representation of the temporal kernel and the hidden representation of the neural network, a random feature representation of the temporal kernel is generated. In some embodiments, a station and independent temporal kernel may be represented as:

$$K_t(t, t') = k(t' - t)$$

for some properly scaled positive even function k(•). Applying Bochner's theorem, which states that:

$$\psi(t' - t) = \int_{\mathbb{R}} e^{-i(t'-t)\omega} ds(\omega)$$

for some probability density functions on $\mathbb{R}$, where s(•) is the spectral density function discussed above. To compute the integral, a sample $(\omega_1, \ldots, \omega_m)$ is sampled from s($\omega$) and a Monte Carlo method may be applied such that:

$$\psi(t' - t) \approx \frac{1}{\sqrt{m}} \sum{}_{i=1}^m e^{-i(t'-t)\omega}$$

Since $e^{-i(t'-t)\omega} = \cos((t'-t)\omega) - i \sin((t'-t)\omega)$, the real part, referred to herein as a random feature representation of $K_T$:

$$\phi(t) = \frac{1}{\sqrt{m}}[\cos(t\omega_1), \sin(t\omega_1), \ldots, \cos(t\omega_m), \sin(t\omega_m)]$$

The random feature representation, $\phi(t)$, may be used to parameterize an unknown kernel function, such as the temporal kernel function discussed above.

In some embodiments, the spectral density function s($\omega$) may be parameterized. If $\theta_T$ represents the distribution parameters for s($\omega$), then $\phi_{\theta_T}$ is also (implicitly) parameterized by $\theta_T$ through sampling $$\{\omega(\theta_T)_i\}_{i=1}^m$$

from s($\omega$). It will be appreciated that sampling of s($\omega$) is similar to a reparametrization trick for training variational objectives, which is discussed below. For a general temporal kernel $K_T(x, t; x', t')$, it is not reasonable to assume stationarity specially for the feature domain. Thus, continuing from the previous example, for any scaled continuous non-stationary positive-definite symmetric (PDS) kernel $K_T$ on $\mathcal{X} \times \mathcal{T}$, there exists a joint probability measure with spectral density function s($\omega_1$, $\omega_2$) such that:

$$K_T((x, t), (x', t')) = \mathbb{E}_{s(\omega_1, \omega_2)}[\phi(x, t)^T \phi(x', t')]$$

where $\phi(x, t)$ is given by:

$$\frac{1}{2\sqrt{m}}\left[\ldots, \cos\left([x, t]^T \omega_{1,i}\right) + \cos\left([x, t]^T \omega_{2,i}\right),\right.$$

$$\left.\sin\left([x, t]^T \omega_{1,i}\right) + \sin\left([x, t]^T \omega_{2,i}\right)\ldots\right]$$

where $$\{\omega_{1,i}, \omega_{2,i}\}_{i=1}^m$$

are the m samples from $s(\omega_1, \omega_2)$ (equation 8). When the sample size $$m \geq \frac{8(d+1)}{\varepsilon^2} \log\left(C(d)(l^2 t_{max}^2 \sigma_p/\varepsilon)^{\frac{2d+2}{d+3}} \middle/ \delta\right),$$

with probability at least $1-\delta$, for any $\varepsilon > 0$, then:

$$\sup_{(x,t),(x',t')} \left|K_T\left((x, t), (x', t')\right) - \phi(x, t)^T \phi(x', t')\right| \leq \varepsilon$$

where $$\sigma_p^2$$

is the second moment of the spectral density function $s(\omega_1, \omega_2)$ and $C(d)$ is a constant. The random feature representation in equation 8 is a generalization of the stationary kernel that provides composition in the kernel space equivalent to the computationally efficient operation $f^{(h)}(x) \circ \phi(x, t)$ in the feature space and preserves a similar Gaussian process behavior and the neural tangent kernel results, as discussed above. For forward-passing models, the original hidden representation of $f^{(h)}(x)$ by the time aware representation of $f^{(h)}(x) \circ \phi(x,t)$. It will be appreciated that existing methods and results for analyzing neural networks through Gaussian process and NTK can be directly carried out on the temporal representation.

In some embodiments, a gradient computation for parameters of the spectral distribution may be performed using only samples thereof. For example, given the case where $s(\omega)$ is given by a normal distribution $N(\mu, \Sigma)$ with parameters $\theta_T = [\mu, \Sigma]$. When computing the gradients of $\theta_T$, instead of sampling from the intractable distribution $s(\omega)$, a model can reparameterize each sample $\omega_i$ via $\Sigma^{1/2}\in + \mu$, where $\in$ is sampled from a standard multivariate normal distribution. The gradient computations that relied on $\omega$ is now replaced using $\in$ and $\theta_T = [\mu, \Sigma]$, which are tractable parameters in the model given $\in$.

As one example, consider a single-dimension homogenous linear model: $f(\theta, x) = f^{(0)}(x) = \theta x$. Without loss of generality, a single sample $\omega_1$ from $s(\omega)$ can be used which corresponds to the feature-independent temporal kernel $k_\theta(t, t')$. The time-aware hidden representation for this layer for datapoint $(x_1, t_1)$ is given by:

$$f_{\theta,\mu,\sigma}^{(0)}(x_1, t_1) = \frac{1}{\sqrt{2}\left[\theta x_1 \cos(t_1 \omega_1), \theta x_1 \sin(t_1 \omega_1)\right]}, \quad \omega_1 \sim N(\mu, \sigma)$$

Using reparametrization, given sample $\in_1$ from the standard normal distribution provides:

$$f_{\theta,\mu,\sigma}^{(0)}(x_1, t_1) = \frac{1}{\sqrt{2}\left[\theta x_1 \cos\left(t_1\left(\sigma^{1/2}\epsilon_1 + \mu\right)\right), \theta x_1 \sin\left(t_1\left(\sigma^{1/2}\epsilon_1 + \mu\right)\right)\right]},$$

$$\omega_1 \sim N(\mu, \sigma)$$

The gradients with respect to all parameters $(\theta, \mu, \sigma)$ can be computed using known methods.

Reparameterization provides that the spectral density is learnt from the data instead of being given. In order to provide consistency, restrictions may be applied to the spectral distribution. For example, let $K_T(S) = \mathbb{E}[\phi^T \phi]$, where the random feature vector $\phi$ has its samples $$\{\omega_i\}_{i=1}^m$$

drawn from the spectral distribution S. Given a neural network kernel $\Sigma^{(h)}$, the neural temporal kernel is denoted by:

$$\sum_T^{(h)}(S) = \sum^{(h)} \otimes K_T(S)$$

The sample version of $$\sum_T^{(h)}(S)$$

for the dataset $$\{x_i, t_i\}_{i=1}^n$$

is given by:

$$\sum_T^{(h)}(S) = \frac{1}{n(n-1)} \sum_{i \neq j} \Sigma^h(x_i, x_j) \phi(x_i, t_i)^T \phi(x_j, t_j), \quad \phi \sim S$$

Based on the foregoing, consider the f-divergence such that $d(S_{\theta_T} \| S) = \int c(dS_{\theta_T}/dS)dS$, with a generator function $c(x) = x^k - 1$ for any $k > 0$. Given the neural network kernel $\Sigma^h$, let $M = \|\mathbb{E}^h\|_\infty$, then:

$$Pr\left(\sup_{d(S_{\theta_T} \| S) \leq \delta} \left|\hat{\sum}_T^{(h)}(S_{\theta_T}) \to \mathbb{E}\left[\hat{\sum}_T^{(h)}(S_{\theta_T})\right]\right| \geq \varepsilon\right) \leq$$

$$\sqrt{2} \exp\left(\frac{-n\varepsilon^2}{64 \max\{4, M\}(\delta+1)}\right) + C(\varepsilon)$$

-continued $$\text{where } C(\varepsilon) \propto \left( \frac{2l^2 t_{max}^2 \sigma S_{\theta_T}}{\varepsilon / \max\{4, M\}} \right)^{\frac{2d+2}{d+3}} \exp\left( - \frac{d_h \epsilon^2}{32 \max\{16, M^2\}(d+3)} \right)$$

that does not depend on $\delta$. So long as the divergence between the learnt $S_{\theta_T}$ and the true spectral distribution is bounded, instead of specifying a distribution family, a universal distribution approximator, such as the invertible neural network (INN), may be used. INN consists of a series of invertible operations that transform samples from a known auxiliary distribution (such as normal distribution) to arbitrarily complex distributions. In some embodiments, the Jacobian that characterize the changes of distributions are made invertible by INN, such that gradient flow is computationally tractable, similar to the single-dimension homogeneous linear model example discussed above.

In some embodiments, a universal modification to existing deep learning architectures to incorporate the temporal kernel approach discussed above may be provided. For example, in some embodiments, a forward pass and parameter updated process may be defined using the L-layer FFN as an example. For example, a FFN network, invertible neural network, selected hidden layer, loss associated with each input, and an auxiliary distribution may be provided as an input. For each selection (e.g., batch) within the input, a sample is obtained from the auxiliary distribution. The reparametereized samples are computed using the INN. For each sample, a random feature representation is constructed using the reparameterized samples, a forward pass of the FNN is performed, and a gradient computation is performed to compute the gradient for the FFN and INN respectively (conditioned on samples from the auxiliary distribution). This process may be represented as:

At step 108, a trained prediction model 160 is output from the prediction model generation system 28 and provided to one or more other systems, such as, for example, the item recommendation system 26. In some embodiments, the trained prediction model 160 is configured to receive a set of prior user interactions and generate a ranked list of personalized item recommendations for a user. In some embodiments, the trained prediction model 160 is configured to receive a set of candidate items and rank the set of candidate items based on the set of prior user interactions. In some embodiments, the trained prediction model 160 is configured to generate time-aware, personalized item recommendations for each user based on a set of prior user interactions with an e-commerce system.

At optional step 110, in some embodiments, the trained prediction model 160 is configured to provide model weights 162 to one or more other systems for review. The model weights 162 may be used to determine which interactions in the set of prior system interactions 152 contribute most to item recommendations generated by the trained prediction model 160. The model weights 162 may be used to determine why a product recommendation and/or product ranking was generated. For example, in some embodiments, model weights 162 may be reviewed and/or modified to determine when and why a certain set of items contained within a product catalog are recommended.

Figure 6:
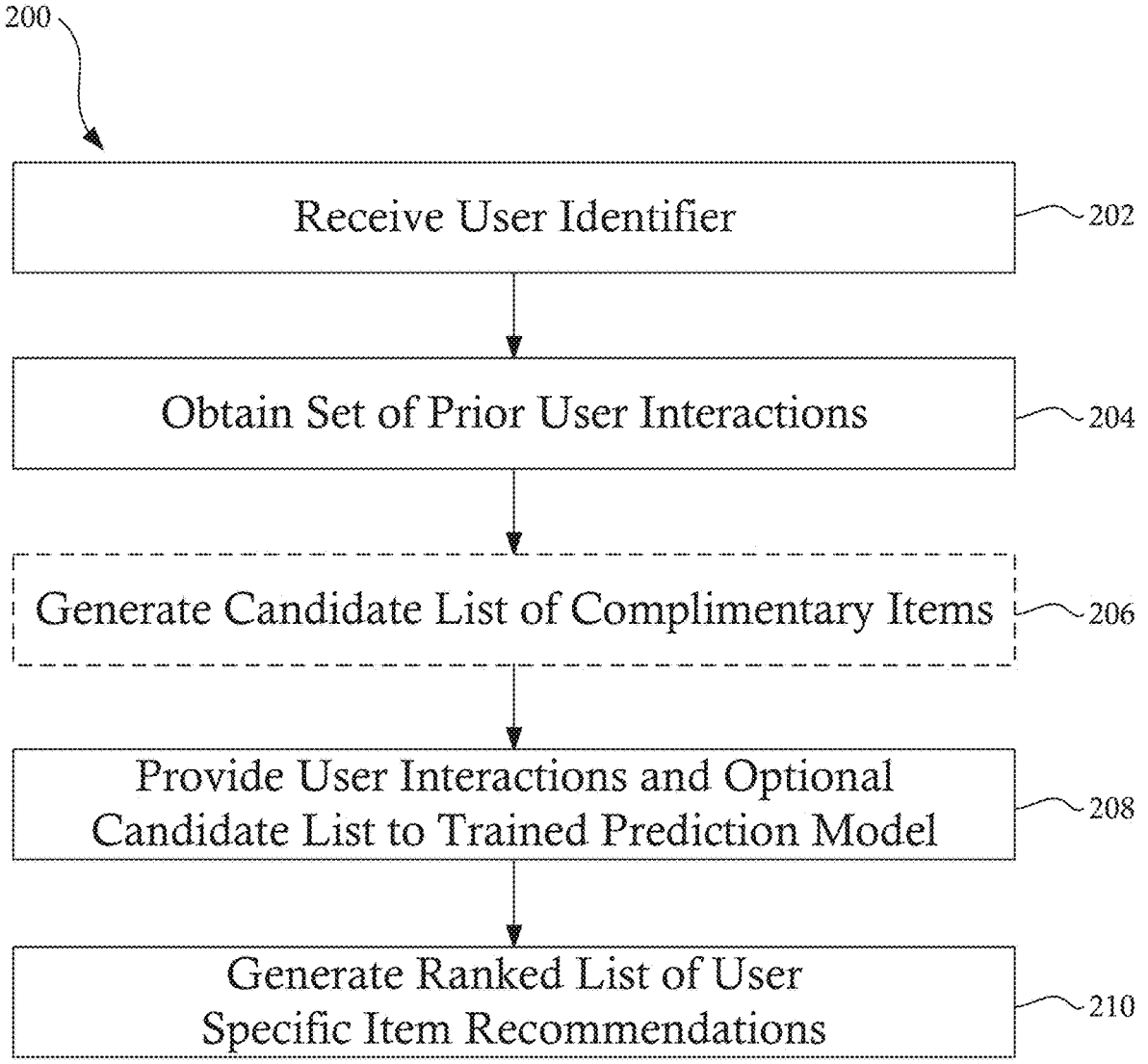
FIG. 6 is a flowchart illustrating a method of generating item recommendations in a network environment, in accordance with some embodiments.
Figure 7:
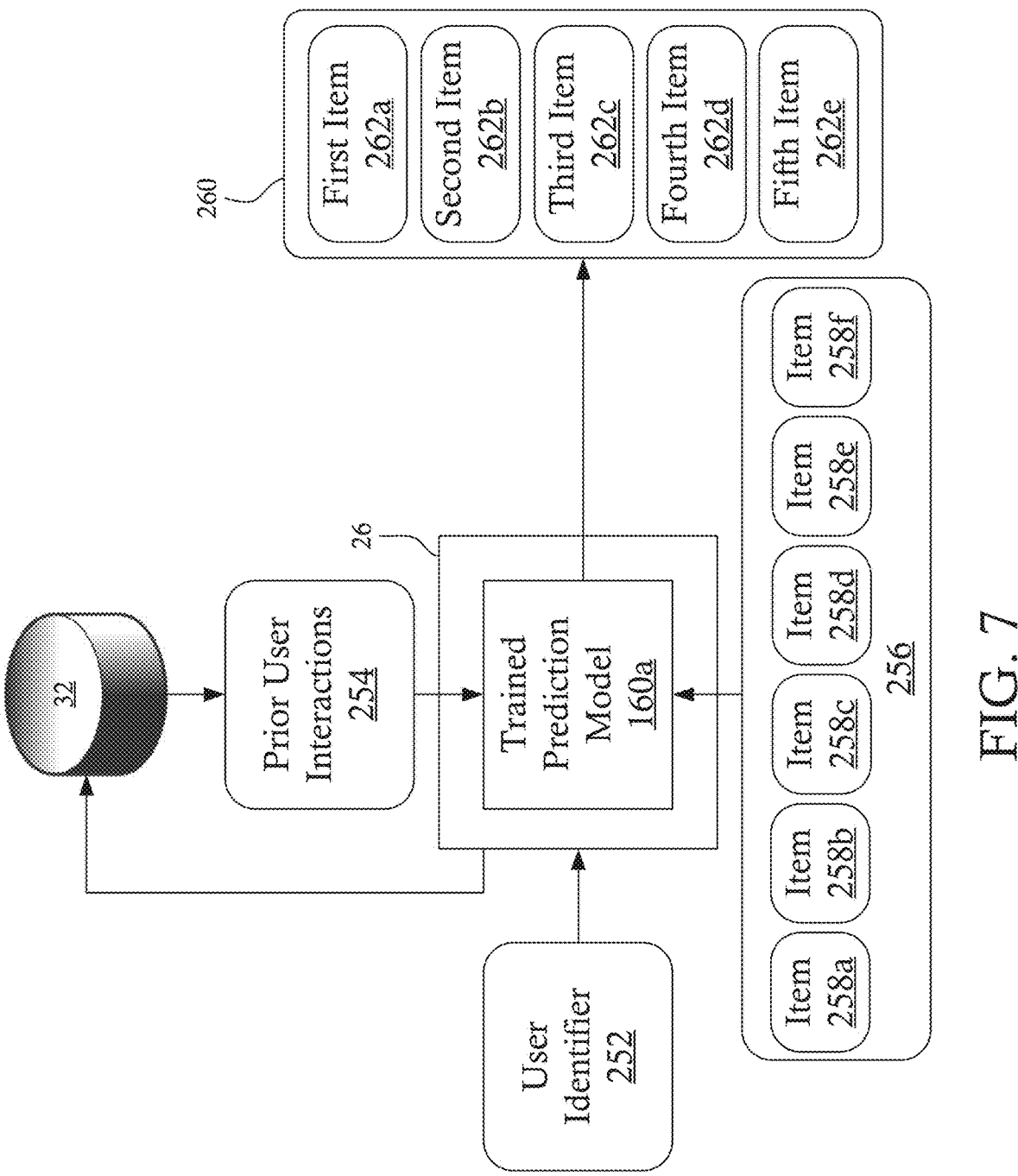
FIG. 7 is a process flow illustrating various steps of the method illustrated in FIG. 6, in accordance with some embodiments.

FIG. 6 is a flowchart illustrating a method 200 of generating user-specific predictions in an e-commerce environment, in accordance with some embodiments. FIG. 7 is a process flow 250 illustrating various steps of the method 200, in accordance with some embodiments. At step 202, a user identifier 252 is received by a suitable system, such as an e-commerce system 24 and/or an item recommendation system 26. The user identifier 252 may be received, for example, from a user system 22a, 22b. The user identifier 252 may include any suitable identifier, such as, for example, a cookie, a beacon, a user log-in, an IP address, and/or any other suitable user identifier. In some embodiments, the user identifier 252 may be received by the e-commerce system 24 and subsequently provided to one or more other systems by the e-commerce system 24, such as, for example, the item recommendation system 26.

At step 204, a set of prior user interactions 254 associated with the user identifier 252 are received by a suitable system, such as the item recommendation system 26. The set of prior user interactions 254 includes a plurality of product inter-

---

Input: Feed-Forward Network (FFN) $f(\theta;) = \{f^{(1)}(\theta;), \ldots, f^{(L)}(\theta;)\}$, invertible neural network $g(\psi;)$, a selected hidden layer h, a loss $\ell_i$ associated with each input $(x_i, t_i)$, and the auxiliary distribution P.
for each batch do
    Sample $\{\epsilon_{1,j}, \epsilon_{2,j}\}_{j=1}^m$ from the auxiliary distribution P;
    Compute the reparameterized samples $\omega$ using the INN $g(\psi;)$,
    e.g., $\omega_{1,j}(\psi) := (\psi, \epsilon_{1,j})$;
    for sample i in the batch do
        Construct the random feature representation $\phi_\psi(x_i, t_i)$ using the
        reparameterized samples, according to the equation:

$$\frac{1}{2\sqrt{m}}[\ldots, \cos([x, t]^T \omega_{1,i}) + \cos([x, t]^T \omega_{2,i}), \sin([x, t]^T \omega_{1,i}) + \sin([x, t]^T \omega_{2,i})\ldots]$$

Forward Pass: get $f^{(h)}(\theta, \psi)$, let $f^{(h)}((\theta, \psi), x_i, t_i) := f^{(h)}(\theta, x_i) \circ \phi_\psi(x_i, t_i)$,
        which is passed to the following feed-forward layers to obtain a final output $\hat{y}_i$;
        Gradient Computation: compute the gradients $\nabla_\theta \ell_i(\hat{y}_i)|_\epsilon, \nabla_\psi \ell_i(\hat{y}_i)|_\epsilon$ for the
        FFN and INN respectively, condition on the samples from the auxiliary
        distribution;
    end
    Update the parameters using the selected optimizer in a standard batch-wise fashion
end

--- actions and time values for each product interaction for a specific user associated with the user identifier 252. The product interactions may include, but are not limited to, item searches, add-to-cart interactions, product views, product purchases, user specific preferences, and/or any other suitable interaction. The time value associated with each product interaction may include a time stamp or other time indicator that associates the product interaction with a predetermined time period. The temporal information may be system-independent time information (e.g., Greenwich Mean time (GMT)), system-dependent time information (e.g., local time), relative time information (e.g., time since a specific start point or event), and/or stored in any other suitable format. The set of prior user interactions 254 may be maintained by any suitable storage mechanism, such as an interaction database 32. The set of prior user interactions 254 may be stored and/or retrieved in any suitable form, such as, for example, log files maintained by one or more systems within network 20, such as, for example, the network interface system 24. Although specific embodiments are discussed herein, it will be appreciated that any suitable data structure, format, location, etc. may be used to store prior user interactions.

At optional step 206, the item recommendation system 26 generates and/or receives a set of candidate complimentary items 256. The set of candidate complimentary items 256 may include one or more complimentary items 258a-258f previously identified and/or selected for one or more items (or products) included in the set of prior user interactions 254. For example, in various embodiments, the set of candidate complimentary items 256 may include items 258a-258f that are frequently purchased with, in the same category as, made by the same manufacturer as, and/or otherwise associated with a product in the set of prior user interactions 254. The set of candidate complimentary items 256 may be generated using any suitable method, such as, for example, a trained neural network, clustering, and/or any other suitable mechanism.

At step 208, the set of prior user interactions 254 and the optional set of candidate complimentary items 256 are provided to a trained prediction model 160a. The trained prediction model 160a may be maintained by any suitable system, such as, for example, the item recommendation system 26. The trained prediction model 160a is generated using a temporal kernel approach to incorporate continuous-time information, for example, according to the method 100 discussed above in conjunction with FIGS. 3 & 4. The trained prediction model 160a may be retrieved from a production environment and implemented on one or more systems within a computing cluster.

At step 210, the trained prediction model 160a generates time-aware, personalized item recommendations 260. The personalized item recommendations 260 includes a set of ranked items 262a-262e corresponding to user interests based on various user interactions weighted over time. For example, in some embodiments, the trained prediction model 160a includes a neural network structure configured to incorporate continuous-time information using a random feature representation. The trained prediction model 160a may be configured to account for long-term user interest (including long-term interests and/or preferences) and short-term interest. In some embodiments, the set of ranked items 262a-262e includes items selected from the optional set of candidate complimentary items 258a-258f. In other embodiments, the set of ranked items 262a-262e are selected and ranked by the trained prediction model 160a independently. The personalized item recommendations 260 may be provided to the network interface system 24 for presentation to a corresponding user system 22a, 22b.

At optional step 212, the personalized item recommendations 260 and/or time-aware weighting factors 162a used by the trained prediction model 160a to generate the ranked list are output and, for example, stored in a database. The personalized item recommendations 260 and/or the time-aware weighting factors 162a may be retrieved and reviewed to identify how and why the personalized item recommendations 260 were generated and to provide insight into operation of the trained prediction model 160a.

The disclosed systems and methods for deep learning for continuous-time information using a temporal kernel approach provide distinct advantages over existing deep learning mechanisms. For example, the temporal kernel approach consistently improves the performance of deep learning models, both for general architectures (e.g., RNN, CNN, CausalCNN, attention mechanisms, etc.) as well as domain-specific architectures in the presence of continuous-time information. This improvement is provided without any cost to computation efficiency and stability. In addition, the disclosed systems and methods outperform alternative approaches for incorporating continuous-time information into deep learning models. Examples of the improvements provided by the disclosed systems and methods are provided in Da Xu, et al., *A Temporal Kernel Approach for Deep Learning with Continuous-Time Information*, ICLR 2021, which is incorporated herein by reference in its entirety.

Although the subject matter has been described in terms of exemplary embodiments, it is not limited thereto. Rather, the appended claims should be construed broadly, to include other variants and embodiments, which may be made by those skilled in the art.

What is claimed is:

1. A system for deep learning, comprising:
   a computing device, comprising at least one processor, the at least one processor is configured to:
      receive a training data set including continuous-time data;
      receive a deep learning architecture;
      generate a trained deep learning model using a temporal kernel approach that includes computing a gradient for the deep learning architecture and an invertible neural network, comprising:
         constructing a temporal kernel based on the continuous-time data; and
         composing the temporal kernel with a selected hidden layer of the deep learning architecture to generate a hidden output; and
      output the trained deep learning model, wherein the temporal kernel is constructed using a random feature representation generated using a spectral density function, wherein the random feature representation is generated using reparameterization performed using the invertible neural network.

2. The system of claim 1, wherein the trained deep learning model is executed by the at least one processor to perform item recommendation.

3. A non-transitory computer readable medium having instructions stored thereon, wherein the instructions, when executed by a processor cause a device to perform operations comprising:
   receiving a training data set including continuous-time data;
   identifying a deep learning architecture;
   training a deep learning model using a temporal kernel approach that includes computing a gradient for the deep learning architecture and an invertible neural network, comprising:
      constructing a temporal kernel based on the continuous-time data; and
      composing the temporal kernel with a selected hidden layer of the deep learning architecture to generate a hidden output; and
   outputting the trained deep learning model, wherein the temporal kernel is constructed using a random feature representation generated using a spectral density function, and wherein the random feature representation is generated using reparameterization performed using the invertible neural network.

4. The non-transitory computer readable medium of claim 3, wherein the trained deep learning model is executed by the processor to perform item recommendation.

5. A computer-implemented method, comprising:

receiving continuous-time data;

identifying a deep learning architecture;

training a deep learning model that includes computing a gradient for the deep learning architecture and an invertible neural network by:

constructing a temporal kernel based on the continuous-time data; and composing the temporal kernel with a selected hidden layer of the deep learning architecture to generate a hidden output; and outputting the trained deep learning model, wherein the temporal kernel is constructed using a random feature representation generated using a spectral density function, and wherein the random feature representation is generated using reparameterization performed using the invertible neural network.

6. The computer-implemented method of claim 5, wherein the trained deep learning model is executed by at least one processor of a computing device to perform item recommendation.

* * * * *